United States Patent
Cimadamore et al.

(10) Patent No.: US 11,513,779 B2
(45) Date of Patent: Nov. 29, 2022

(54) MODELING FOREIGN FUNCTIONS USING EXECUTABLE REFERENCES

(71) Applicant: Oracle International Corporation, Redwood Shores, CA (US)

(72) Inventors: Maurizio Cimadamore, Donabate (IE); James Malcolm Laskey, Lunenburg (CA); Jorn Bender Vernee, Leiden (NL); Vladimir Vitalyevich Ivanov, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/190,214

(22) Filed: Mar. 2, 2021

(65) Prior Publication Data

US 2021/0294586 A1    Sep. 23, 2021

Related U.S. Application Data

(60) Provisional application No. 62/992,012, filed on Mar. 19, 2020.

(51) Int. Cl.
| | |
|---|---|
| *G06F 8/41* | (2018.01) |
| *G06F 12/02* | (2006.01) |
| *G06F 9/445* | (2018.01) |

(52) U.S. Cl.
CPC ............ *G06F 8/44* (2013.01); *G06F 9/44557* (2013.01); *G06F 12/0223* (2013.01); *G06F 8/443* (2013.01); *G06F 2212/7202* (2013.01)

(58) Field of Classification Search
CPC ..... G06F 8/40; G06F 8/41; G06F 8/44; G06F 8/443; G06F 8/51; G06F 8/52; G06F 12/0223; G06F 2212/7202

(Continued)

(56) References Cited

U.S. PATENT DOCUMENTS

| | | |
|---|---|---|
| 5,319,760 A | 6/1994 | Mason et al. |
| 5,537,592 A | 7/1996 | King et al. |

(Continued)

OTHER PUBLICATIONS

Thalinger, C., et al., Optimizing Invokedynamic, PPPJ '10: Proceedings of the 8th International Conference on the Principles and Practice of Programming in Java, Sep. 2010, pp. 1-9, [retrieved on Feb. 12, 2022], Retrieved from the Internet: <URL:http://dl.acm.org/>.*

(Continued)

*Primary Examiner* — Geoffrey R St Leger

(74) *Attorney, Agent, or Firm* — Invoke

(57) ABSTRACT

Techniques for representing a native function using an executable reference are disclosed. The system receives an instruction to create an executable reference for a native function, including a method type comprising a method signature corresponding to the executable reference, and a function description including (a) a memory layout corresponding to data returned by the function and (b) memory layouts corresponding to parameters required by the function. The system selects an application binary interface (ABI). The system generates code that, for each parameter, of the one or more parameters required by the function, converts the parameter from a value formatted for use by a Java Virtual machine to a value formatted for use in the native function, based on the selected ABI. Responsive to invocation of the executable reference, the generated code and the native function may be executed.

30 Claims, 9 Drawing Sheets

(58) Field of Classification Search
USPC .......................................... 717/137, 140, 151
See application file for complete search history.

(56) References Cited

U.S. PATENT DOCUMENTS

| | | | |
|---|---|---|---|
| 5,946,713 | A | 8/1999 | Hacking et al. |
| 5,991,856 | A | 11/1999 | Spilo et al. |
| 6,066,181 | A * | 5/2000 | DeMaster ............... G06F 8/51 717/148 |
| 6,237,110 | B1 | 5/2001 | Lin et al. |
| 6,446,034 | B1 | 9/2002 | Egolf |
| 8,209,510 | B1 | 6/2012 | Thathapudi et al. |
| 11,221,951 | B1 | 1/2022 | Abhishek et al. |
| 2002/0144077 | A1 | 10/2002 | Andersson et al. |
| 2002/0147916 | A1 | 10/2002 | Strongin et al. |
| 2003/0126398 | A1 | 7/2003 | Shinozaki |
| 2006/0195626 | A1 | 8/2006 | Arndt et al. |
| 2007/0005911 | A1 | 1/2007 | Yang et al. |
| 2007/0288682 | A1 | 12/2007 | Czajkowski et al. |
| 2008/0046997 | A1 | 2/2008 | Wang |
| 2008/0209578 | A1 | 8/2008 | Ghetie |
| 2009/0089531 | A1 | 4/2009 | Johnson et al. |
| 2012/0047343 | A1 | 2/2012 | Farrell et al. |
| 2012/0210095 | A1 | 8/2012 | Nellans et al. |
| 2012/0233378 | A1 | 9/2012 | Elteto |
| 2013/0132698 | A1 | 5/2013 | Huang |
| 2014/0033304 | A1 | 1/2014 | Lewis |
| 2014/0075136 | A1 | 3/2014 | Davies |
| 2015/0006962 | A1 | 1/2015 | Swanson et al. |
| 2015/0089178 | A1 | 3/2015 | Furdui |
| 2015/0149592 | A1 | 5/2015 | Gibbon et al. |
| 2016/0085687 | A1 | 3/2016 | Baruch et al. |
| 2016/0274792 | A1 | 9/2016 | Ogawa |
| 2017/0115975 | A1 * | 4/2017 | Rose ................... G06F 9/4484 |
| 2017/0116017 | A1 * | 4/2017 | Rose ................... G06F 9/44521 |
| 2020/0409734 | A1 | 12/2020 | Sahita et al. |
| 2021/0334019 | A1 | 10/2021 | Grisenthwaite et al. |

OTHER PUBLICATIONS

Application Binary Interface, Wikipedia, 2017, 4 pages, [retrieved on Feb. 12, 2022], Retrieved from the Internet: <URL:https://web.archive.org/web/20170307083910/https://en.wikipedia.org/wiki/Application_binary_interface>.*

Java Native Interface, Wikipedia, 2017, 5 pages, [retrieved on Feb. 12, 2022], Retrieved from the Internet: <URL:https://web.archive.org/web/20170325020302/https://en.wikipedia.org/wiki/Java_Native_Interface>.*

B. Wong, G. Czajkowski and L. Daynes, "Dynamically loaded classes as shared libraries: an approach to improving virtual machine scalability," Proceedings International Parallel and Distributed Processing Symposium, 2003, p. 10 pp.—, doi: 10.1109/IPDPS .2003.1213123. (Year: 2003).

J. Roney, T. Appel, P. Pinisetti and J. Mickens, "Identifying Valuable Pointers in Heap Data," 2021 IEEE Security and Privacy Workshops (SPW), 2021, pp. 373-382, doi: 10.1109/SPW53761.2021.00057. (Year: 2021).

M. Cesati, R. Mancuso, E. Betti and M. Caccamo, "A Memory Access Detection Methodology for Accurate Workload Characterization," 2015 IEEE 21st International Conference on Embedded and Real-Time Computing Systems and Applications, 2015, pp. 141-148, doi: 10.1109/RTCSA.2015.30. (Year: 2015).

* cited by examiner

MODELING FOREIGN FUNCTIONS USING EXECUTABLE REFERENCES

INCORPORATION BY REFERENCE; DISCLAIMER

This application is hereby incorporated by reference: application No. 62/992,012 filed on Mar. 19, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates invocation of foreign methods. In particular, the present disclosure relates to modeling foreign methods using an executable method reference (e.g., a MethodHandle object).

BACKGROUND

While Java is a powerful programming language, there may be times when a user desires to write code in different languages. For example, if the user wishes to utilize a platform specific feature that is not supported in the standard Java class library, or if the user wishes to utilize a function that has already been written in another programming language.

The Java Native Interface (JNI) is a foreign function interface programming framework that enables Java code running in a Java virtual machine (JVM) to call and be called by native applications (programs specific to a hardware and operating system platform) and libraries written in C, C++, or assembly. In the JNI framework, native functions are implemented in separate files. When the JVM invokes a native function, it passes any Java arguments declared by the Java method.

However, JNI requires that the source code include a static declaration of the native function. Accordingly, each native function must be separately declared statically and compiled to create a header file associated with the native function. Finally, a separate native file is needed for converting the java arguments to arguments usable by the native function. Accordingly, using JNI requires that the user have knowledge of the native language in order to implement the native function call. Further, JNI only works well with native data types (e.g., an integer, long, char, string, and the like). In particular, JNI does not work well with struct or pointer arguments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
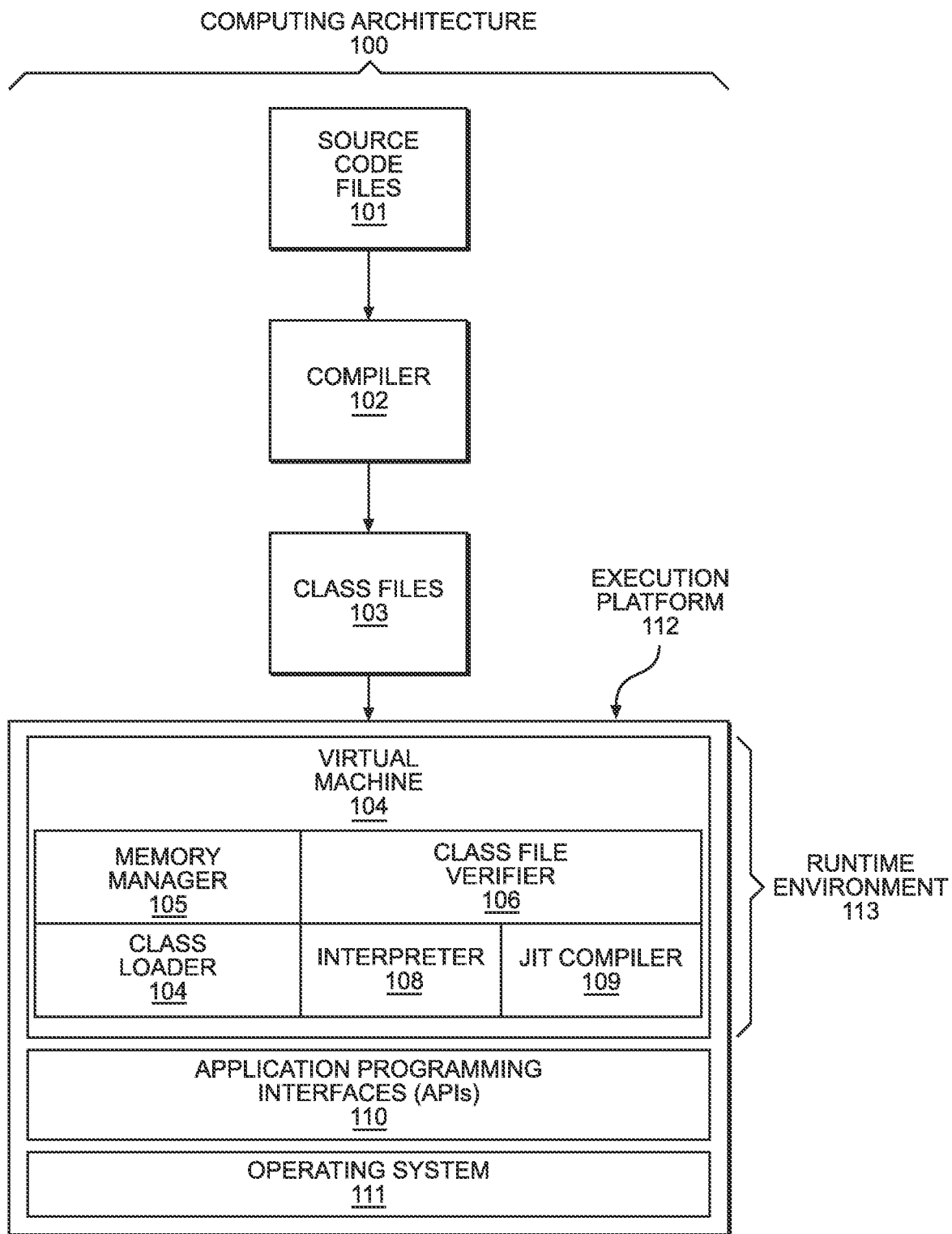
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. LINKING A NATIVE FUNCTION
   3.1 DYNAMIC LINKING OF A NATIVE FUNCTION
   3.2 STATIC LINKING OF A NATIVE FUNCTION
4. INVOKING A NATIVE FUNCTION USING AN EXECUTABLE REFERENCE
5. LINKING A METHOD
6. PASSING A POINTER TO A METHOD IMPLEMENTED IN A SECOND PROGRAMMING LANGUAGE TO A FUNCTION IMPLEMENTED IN A FIRST PROGRAMMING LANGUAGE
7. ALLOCATING MEMORY VIA A NATIVE FUNCTION
8. MISCELLANEOUS; EXTENSIONS
9. HARDWARE OVERVIEW

1. General Overview

One or more embodiments include a method for obtaining an executable reference (e.g., a MethodHandle object) for a native function. An executable reference, such as a MethodHandle object, serves as a typed, directly executable reference to an underlying method, constructor, field, or similar low-level operation, with optional transformations of arguments or return values. A MethodHandle can include one or more invoker methods that provide direct access to the underlying method, constructor, field, or other operation. The invokers accept calls which match the type of the MethodHandle. The system may create a MethodHandle object for the native function using a memory address that specifies an entry point of the native function (e.g., a memory address at which the native function is stored), a method type that represents the arguments and return type accepted and returned by a method handle (e.g., a Java method signature corresponding to the native function), and a function descriptor which specifies a memory layout corresponding to the parameters and return type of the native function. In addition, the system may create a set of "glue code" instructions that convert the parameters used when invoking the native function via a different programming language using the MethodHandle object to the format expected by the language of the native function. Moreover, the conversion of the parameters can include positioning the parameters in a way that the native function expects, such that the native function can be executed using the converted parameters.

In some embodiments, the system obtains a memory address (e.g., a MemoryAddress object) that can be used for passing a pointer to another function. The system can receive a MethodHandle object that specifies the method to be executed and a function descriptor that specifies a memory layout corresponding to the parameters and return type of a native function. The system can return a memory address to be passed as a pointer to the method specified in the MethodHandle. The memory address returned by the system can comprise an address for code that is used to invoke the method using the MethodHandle object.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
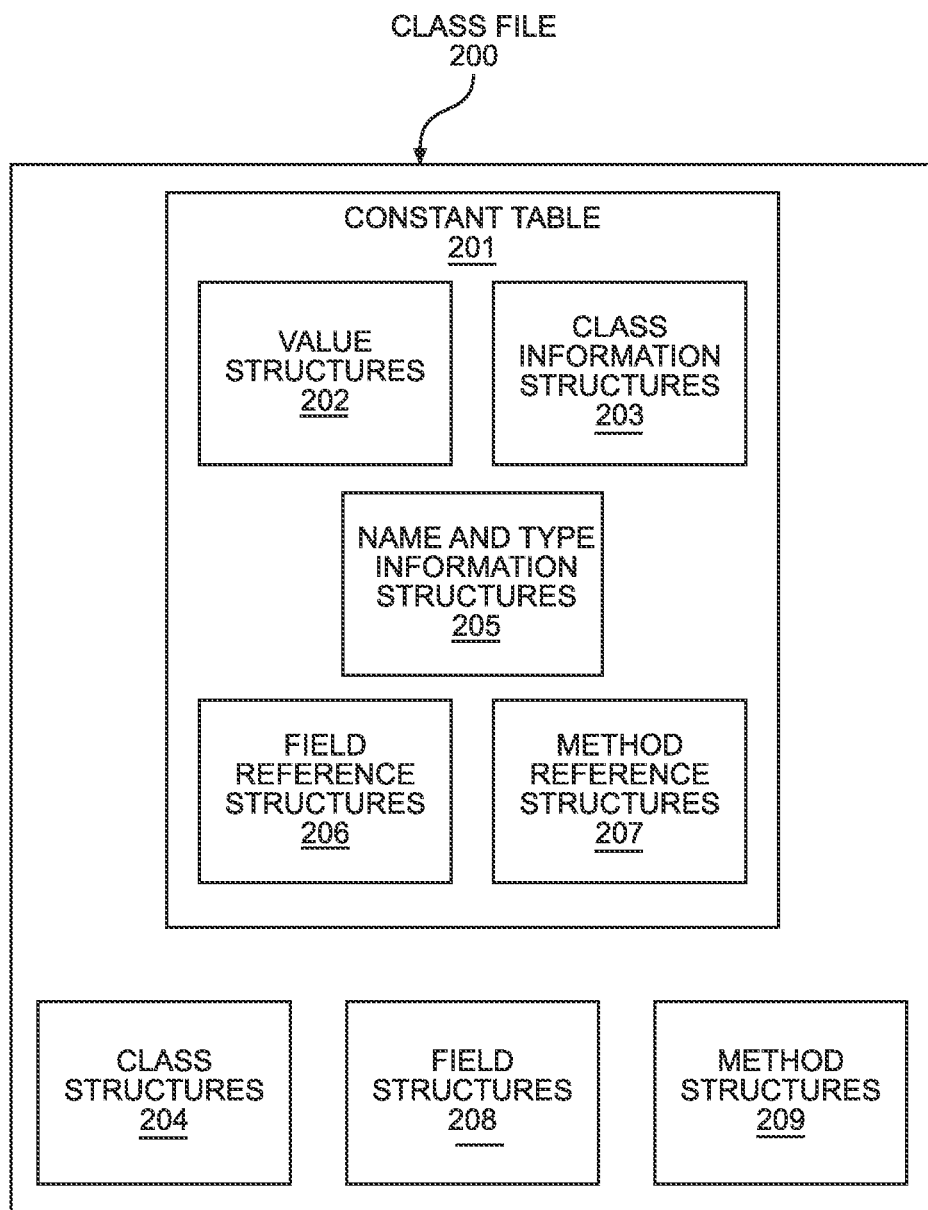
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
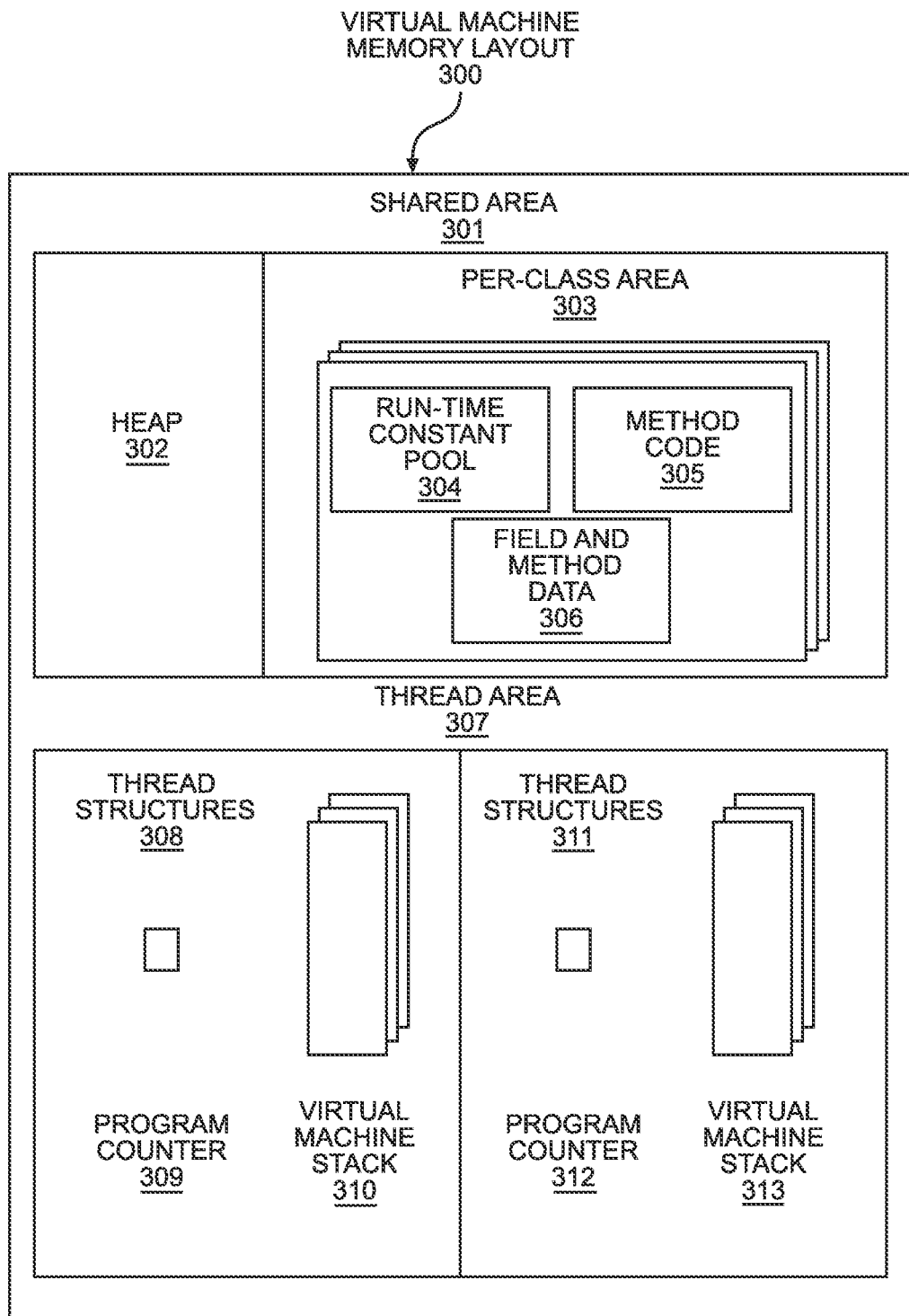
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
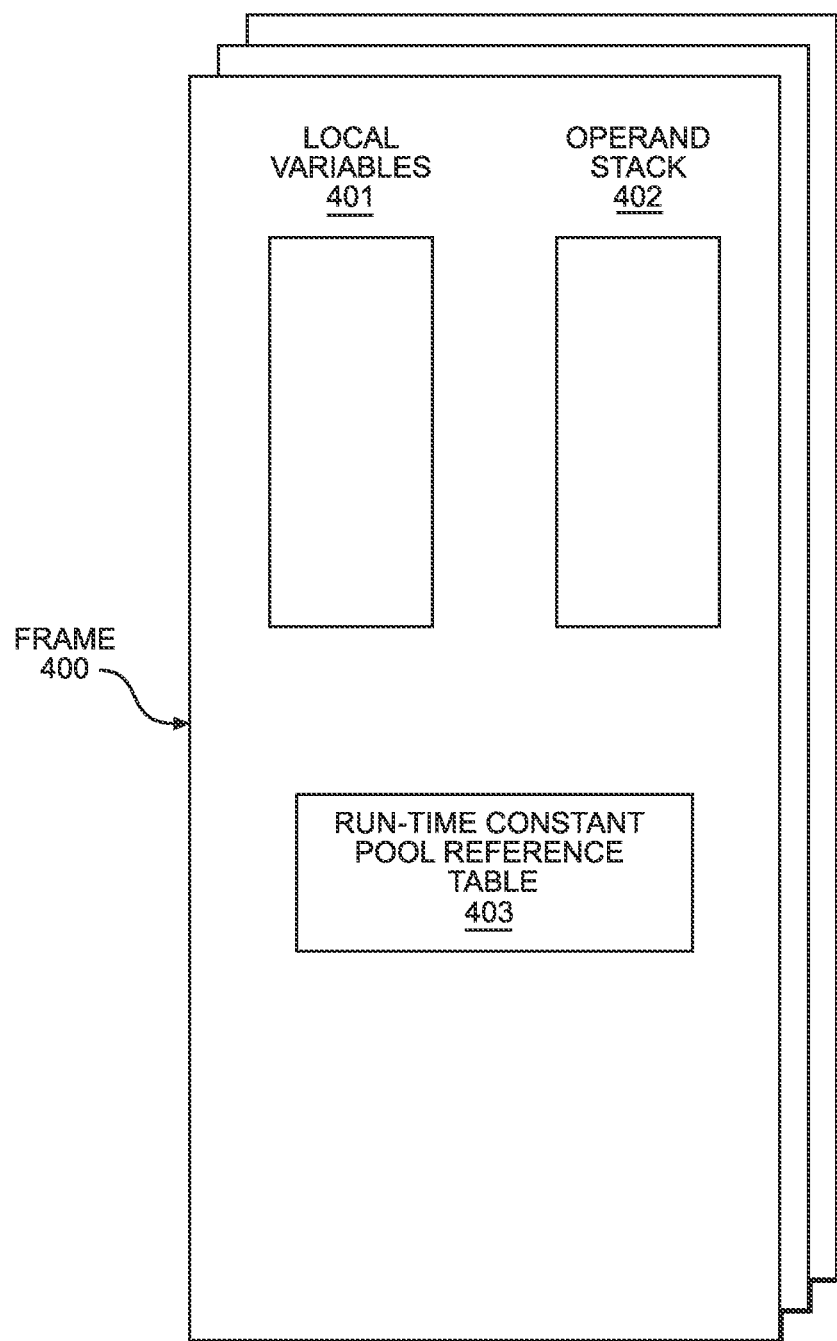
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Linking a Native Function

A native function implemented in a first programming language (e.g., C, C++, Pascal, etc.) can be linked to a method implemented in a second programming language (e.g., Java). The linking can allow the native function to be invoked via the method. In particular, this linking can allow native functions to be invoked through a Java method.

3.1 Dynamic Linking of a Native Function

Figure 5:
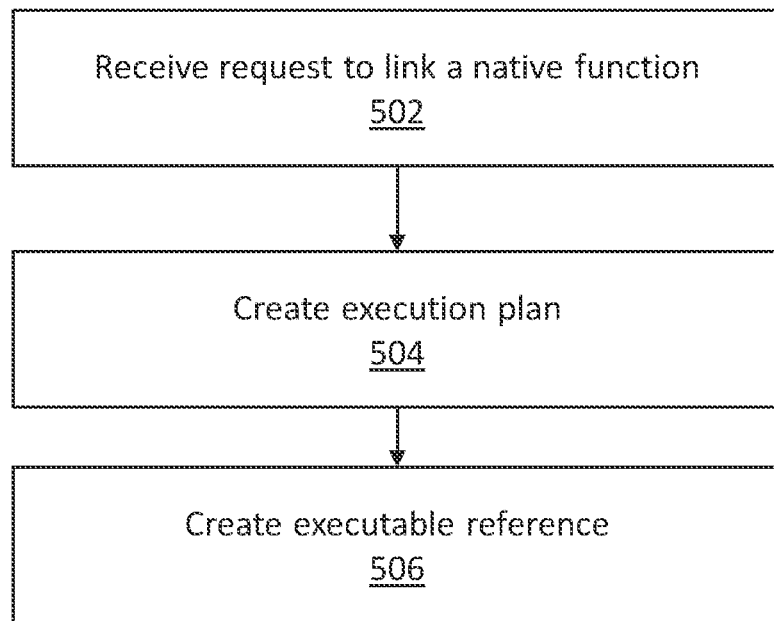
FIG. 5 illustrates a set of operations for linking a native function in accordance with one or more embodiments.

FIG. 5 illustrates a flowchart showing techniques for linking a native function using an executable reference (e.g., a MethodHandle object). One or more operations illustrated in FIG. 5 may be modified, rearranged, or omitted all together. Accordingly, the particular sequence of operations illustrated in FIG. 5 should not be construed as limiting the scope of one or more embodiments.

In embodiments, the system receives a request to create an executable reference (e.g., a MethodHandle object) (Operation 502). The executable reference may be used to link one or more native functions having a particular shape, as described by a function descriptor. In particular, the request to link the executable reference may be used to dynamically specify a function, and thus may be a request to create a dynamic executable reference (e.g., a dynamic MethodHandle object). The request may include a method call that returns an executable reference (e.g., the downcallHandle method).

The request may include, as an argument, a selection of a particular Application Binary Interface (ABI) for use in creating the executable reference. The ABI can be used to define, among other things, a calling convention, which controls how arguments associated with a function are passed and return values are retrieved. As an example, the calling convention can define whether parameters are passed on the stack or are passed in registers, which registers are used for which function parameters, and whether the first function parameter passed on the stack is pushed first or last onto the stack. Additionally, the ABI can be used to define the sizes, layouts, and alignments of basic data types.

The request may include, as an argument, a method type description to be associated with the obtained MethodHandle object (e.g., a MethodType object). The method type includes the types of the arguments and return type accepted and returned by the method handle. The structure of the MethodType object can include a return type and one or more parameter types. The types (e.g., the Java primitive types, void, MemoryAddress, MemorySegment, and reference) can be represented by Class objects.

The request may include, as an argument, a function descriptor that includes a memory layout object that specifies the types and sizes of the return value of the native function and one or more memory layout objects, which each specify the types and sizes of a parameter of the native function. Each memory layout object can include a programmatic description of the return type and/or argument associated with the native function. In some embodiments, the memory layout may define a number of elements to be used by the native function, a number of sub-elements contained in each element, a type of each element, a size of each element, and/or a size of each sub-element. In some embodiments, the function descriptor can be used to define one or more memory addresses and/or one or more memory segments to be passed to the native function, or to be returned by the native function.

The request does not include a memory address or other indicator that specifies a particular native function as an argument. Accordingly, the system may generate a dynamic MethodHandle, object which accepts an extra parameter.

That is, a user invoking the generated MethodHandle must specify, as a parameter, a target function address dynamically. When using the dynamic method handle, the user may supply the address of the native function to be called.

The system may generate an execution plan (Operation 504). In embodiments, the execution plan is generated based on the received request to link the native function. In particular, the execution plan may be created based on at least the ABI, the method type, and the function descriptor.

The execution plan may include a description of how a native function is invoked. The execution plan may include instructions for preprocessing one or more arguments. For example, preprocessing may include splitting or combining values. The execution plan may include one or more argument components. Each argument component of the execution plan can be associated with a particular argument that is passed, as described in the method type descriptor and/or function descriptor, without regard to a particular native function or particular method. Each argument component of the execution plan may cause the system to move a value (e.g., the associated argument) into one or more storage locations for use by a native function that is dynamically specified when the execution plan is invoked. The storage locations can be machine registers and/or slots in the machine stack. In aspects, the execution plan may further include a return component that causes the system to move one or more values returned, as described in the method type descriptor and/or function descriptor to particular storage locations. The storage locations can be machine registers and/or slots in the machine stack.

In some embodiments, the system may create an intermediate buffer for use by the execution plan. The intermediate buffer can be mapped to a particular storage location of the system. For example, each system register may correspond to a unique offset within the intermediate buffer. The execution plan may cause the parameters to be stored within the intermediate buffer and/or to read values from the intermediate buffer. A subroutine (e.g., an assembly program) may be used to move the parameters between the intermediate buffer and the system storage locations. In particular, the intermediate buffer can be used to move data to and from system storage locations for the execution plan. For example, each argument component of the execution plan can cause a value received in the method to be positioned at one or more particular locations of the intermediate buffer. The application may be used to move the arguments from the one or more buffer locations to corresponding system storage locations. As another example, a return value of the native function may be moved from the system storage location to a corresponding offset of the intermediate buffer. The return portion of the execution plan may cause the return value to be read from the intermediate buffer to the method.

The system may create a dynamic executable reference (Operation 506) in response to the received request. The dynamic executable reference can include a reference to the execution plan. When invoked, the dynamic executable reference may include, as a parameter, metadata that includes a reference to a memory address that is an entry point for a native function having the shape specified by the method type descriptor and/or the function descriptor.

3.2 Static Linking of a Native Function

As a particular form of creating a linking for a native function, the system may create an executable reference (e.g., a MethodHandle object) that is specific to a particular native function. That is, the dynamic linking of native functions may be adapted to statically link a particular native function. In particular, the request to link a native function received in Operation 502 may further include, as an argument, a memory address (e.g., a MemoryAddress object) corresponding to the native function. The memory address can be a memory address corresponding to an entry point into the native function.

The system may create an executable reference (e.g., a MethodHandle object) in response to the received request to link the specified native function. The executable reference can include a reference to the execution plan and the memory address of the native function.

4. Executing a Native Function Using an Executable Reference

Figure 6:
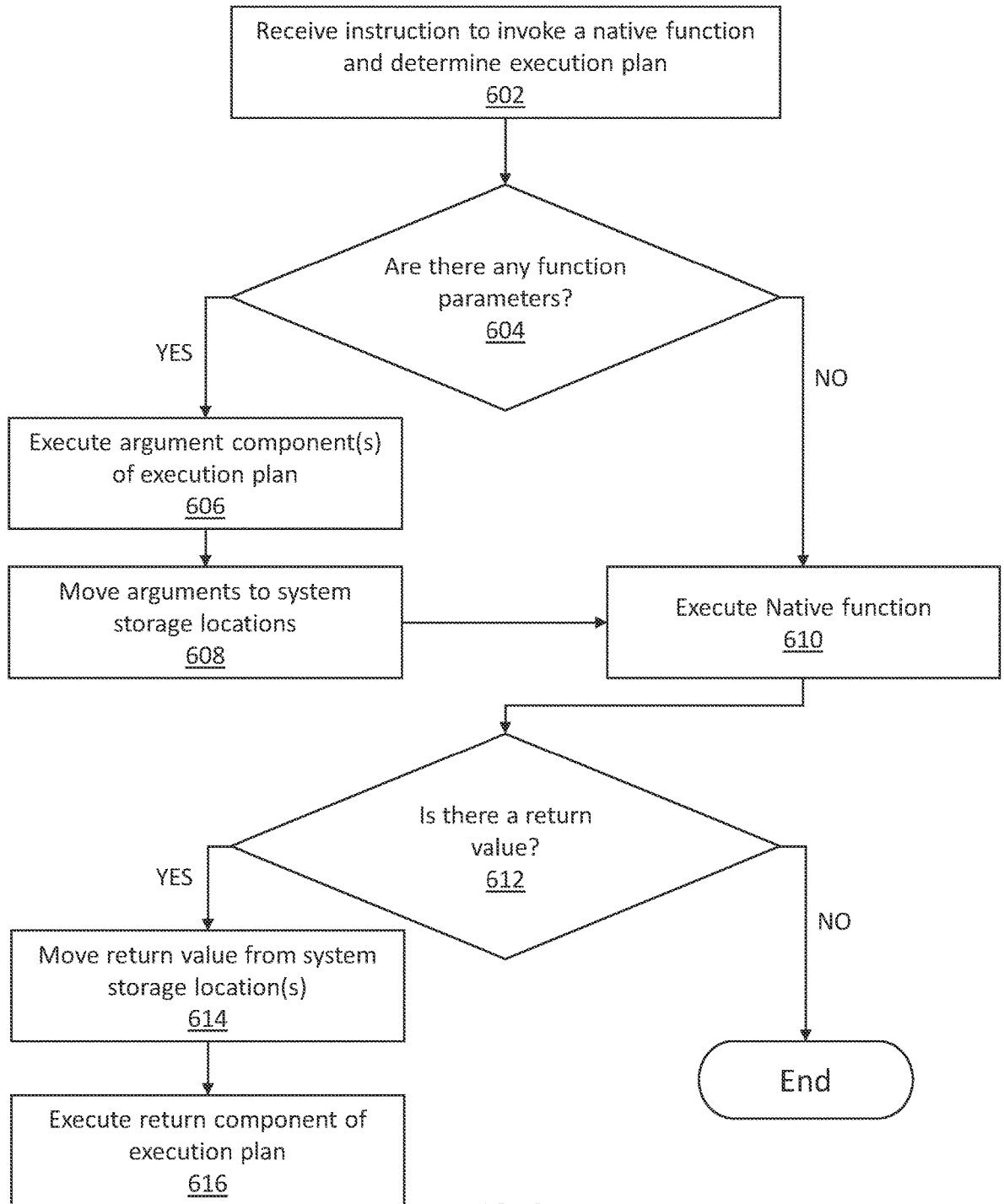
FIG. 6 illustrates a set of operations for invoking a linked native function implemented in a first programming language using an executable reference in accordance with one or more embodiments.
Figure 7:
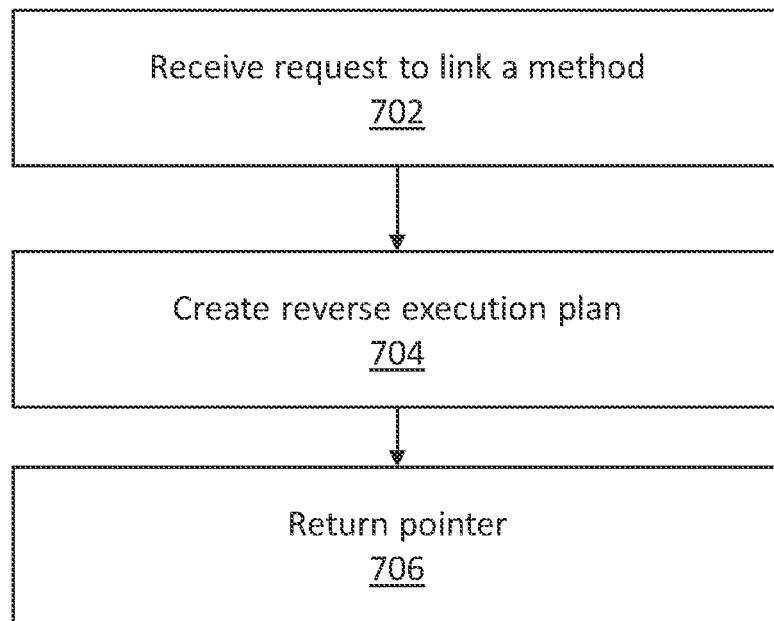
FIG. 7 a set of operations for linking a method in accordance with one or more embodiments.

In some cases, a user may desire to call a native function implemented in a first programming language (e.g., C, C++, Pascal, etc.) from a method implemented in a second programming language (e.g., Java). FIG. 6 illustrates a flowchart showing techniques for executing a native function using an executable reference (e.g., a MethodHandle object). One or more operations illustrated in FIG. 6 may be modified, rearranged, or omitted all together. Accordingly, the particular sequence of operations illustrated in FIG. 6 should not be construed as limiting the scope of one or more embodiments.

The system may receive an instruction which causes execution of a native function (Operation 602). For example, the native function can be invoked via an executable reference. In embodiments, the executable reference may include one or more parameters for use in executing the native function. The system can determine an execution plan based at least in part on the received instruction.

The system may determine if there are any arguments passed with the received instruction (Operation 604). If arguments were passed (YES at operation 604), the system may, for each argument included with the instruction to execute the native function, execute a corresponding argument component of the determined execution plan (Operation 606). As discussed above, the executed argument components of the execution plan may preprocess the arguments based on the method type, the function descriptor and the selected ABI. For example, the method type may specify a Java MemoryAddress object be provided when a function is invoked, and the function descriptor may specify that an argument is received as a C pointer, and specify the size of such a pointer. The ABI can be used to determine the layout and alignment of the C pointer, so that the system can convert the data from the received Java MemoryAddress to a properly-formatted C pointer. Additionally, the executed argument components of the execution plan may further determine a mechanism by which the C pointer should be passed to the native function (e.g., whether the parameter is to be passed on the stack or in a register) and how the parameter should be positioned (e.g., whether the first function parameter passed on the stack is pushed first or last onto the stack, which register is to be used for the parameter). In some embodiments, each executed argument component of the determined execution plan moves the associated argument to the intermediate buffer.

Following execution of the argument components in Operation 606, the system may, in some embodiments, cause the arguments to be moved from the intermediate buffer to the system storage locations (Operation 608). In particular, the system may invoke an assembly routine to move data positioned by the execution plan in operation 604 from the intermediate buffer to the system storage locations. The assembly routine may be selected based on a specified system ABI. In some embodiments, the ABI is specified by a user (e.g., in one or more code instructions).

After moving the arguments to system storage locations in Operation 608, the system may execute the native function (Operation 610). In some embodiments, the system may also execute operation 610 following a determination that no arguments are passed with the request (NO at step 604). In some embodiments, the native function is executed based on the memory address associated with the invoked executable reference. In some embodiments, the native function operates on one or more values (e.g., parameters) passed to the native function, which are properly positioned based on the execution of the parameter components of the execution plan. The native function may produce data comprising a return value, and store the data in one or more system storage locations.

The system may determine if there is a return value from the native function (Operation 612). The system may move the return value from the one or more system storage locations (Operation 614). As one example, the execution plan may cause the system to invoke an assembly routine to move data returned by the native function in operation 608 from the one or more system storage locations to the intermediate buffer. The assembly routine may be selected based on a specified system ABI. In some embodiments, the ABI is specified by a user (e.g., in one or more code instructions).

The system may execute the return component of the selected execution plan (Operation 616). The return component of the execution plan may process the returned values provided by the native function based on the method type, the function descriptor and the selected ABI. For example, the function descriptor may specify that a C pointer is returned, and specify the size of such a pointer. The method type may specify a Java MemoryAddress object is returned. The ABI can be used to determine the layout and alignment of the C pointer, so that the system can convert the data from the received C pointer to a properly-formatted Java MemoryAddress.

5. Linking a Method

A native function implemented in a first programming language (e.g., C, C++, Pascal, etc.) may use a method implemented in a second programming language (e.g., Java) via linking. The linking can allow the method to be invoked by the native function. In particular, this linking can allow native functions to invoke a Java method. For example, a sorting algorithm implemented as a native function may receive, as data, a pointer to a method that can be used to compare elements in an array or other data structure. Accordingly, it may be desirable to pass, to a native function, a pointer to a java method.

In embodiments, the system receives a request to obtain a function pointer (e.g., a MemoryAddress object) for a method (Operation 702). The request can be received in the form of a method call that returns a pointer (e.g., a memory address) to a specified method (e.g., the upcallStub method). The upcallStub method includes, as an argument, a memory address corresponding to the native function. The MemoryAddress can be a memory address corresponding to an entry point into the native function.

The request may include, as an argument, a selection of a particular Application Binary Interface (ABI) for use in creating the executable reference. The ABI can be used to define, among other things, a calling convention, which controls how arguments associated with a function are passed and return values are retrieved. As an example, the calling convention can define whether parameters are passed on the stack or are passed in registers, which registers are used for which function parameters, and whether the first function parameter passed on the stack is pushed first or last onto the stack. Additionally, the ABI can be used to define the sizes, layouts, and alignments of basic data types.

The request may include, as an argument, a MethodHandle associated with the Java method to be executed. In some embodiments, the MethodHandle object includes a method type description (e.g., a MethodType object) including the types of the arguments and return type accepted and returned by the method handle. The structure of the MethodType object can include a return type and one or more parameter types. The types (e.g., the Java primitive types, void, MemoryAddress, MemorySegment, and reference) can be represented by Class objects.

The request may include, as an argument, a function descriptor that includes a memory layout object that specifies the types and sizes of the return value of the native function and one or more memory layout objects, which each specify the types and sizes of a parameter of the native function. Each memory layout object can include a programmatic description of the return type and/or argument associated with the native function. In some embodiments, the memory layout may define a number of elements to be used by the native function, a number of sub-elements contained in each element, a type of each element, a size of each element, and/or a size of each sub-element. In some aspects, the function descriptor can be used to define one or more memory addresses and/or one or more memory segments to be passed to the native function, or to be returned by the native function.

The system may generate a reverse execution plan (Operation 704). In embodiments, the reverse execution plan is generated based on the received request to obtain a function pointer. In particular, the reverse execution plan may be created based on at least the ABI, the method type description, and the function descriptor.

The reverse execution plan may include a description of how a native function can invoke a method coded using a different coding language (e.g., a Java method). The reverse execution plan may include one or more argument components. The one or more argument components of the reverse execution plan may cause the system to move data from a system storage location to a storage area accessible by the method. In embodiments the ABI can be used to determine particular system storage locations from which each of the arguments are moved. The system storage locations can be machine registers and/or slots in the machine stack. In aspects, the reverse execution plan may further include a return component that causes the system to move one or more values returned by the method to one or more particular storage locations. The one or more storage locations can be machine registers and/or slots in the machine stack.

In some embodiments, the system can use the intermediate buffer in executing the reverse execution plan. The intermediate buffer can be mapped to particular storage locations of the system. For example, each system register may correspond to a unique offset within the intermediate buffer. The reverse execution plan may cause the parameters to be stored within the intermediate buffer and/or read values from the intermediate buffer. Similarly, the reverse execution plan may cause a value returned by the method to be placed into one or more offsets of the intermediate buffer, so that the return value may be moved to one or more associated storage locations. Another application (e.g., an assembly program) may be used to move parameters between the intermediate buffer and system storage locations. In particular, the intermediate buffer can be used to move data to and from system storage locations for the reverse execution plan.

The system can return a function pointer (e.g., a MemoryAddress object) that causes execution of at least a portion of the reverse execution plan and the method (Operation 706). In some embodiments, the system may create a function in native code that causes execution of the reverse execution plan and the native method, and may return a function pointer to the created native function.

6. Passing a Pointer to a Method Implemented in a Second Programming Language to a Function Implemented in a First Programming Language In some cases, a user may desire to pass a reference to a method implemented in the second programming language (e.g., Java) to a native function implemented in the first programming language (e.g., C, C++, Pascal, etc.). In native code, it can be desirable to pass functions as data to other functions. For example, sorting algorithms may receive, as data a function that can be used to compare elements in an array or other data structure. Accordingly, it may be desirable to pass, to a native function, a pointer to a java method. As a particular example, a user may wish to pass, to a sorting algorithm implemented as a native function, a pointer to a Java method for use in comparing elements in an array.

Figure 8:
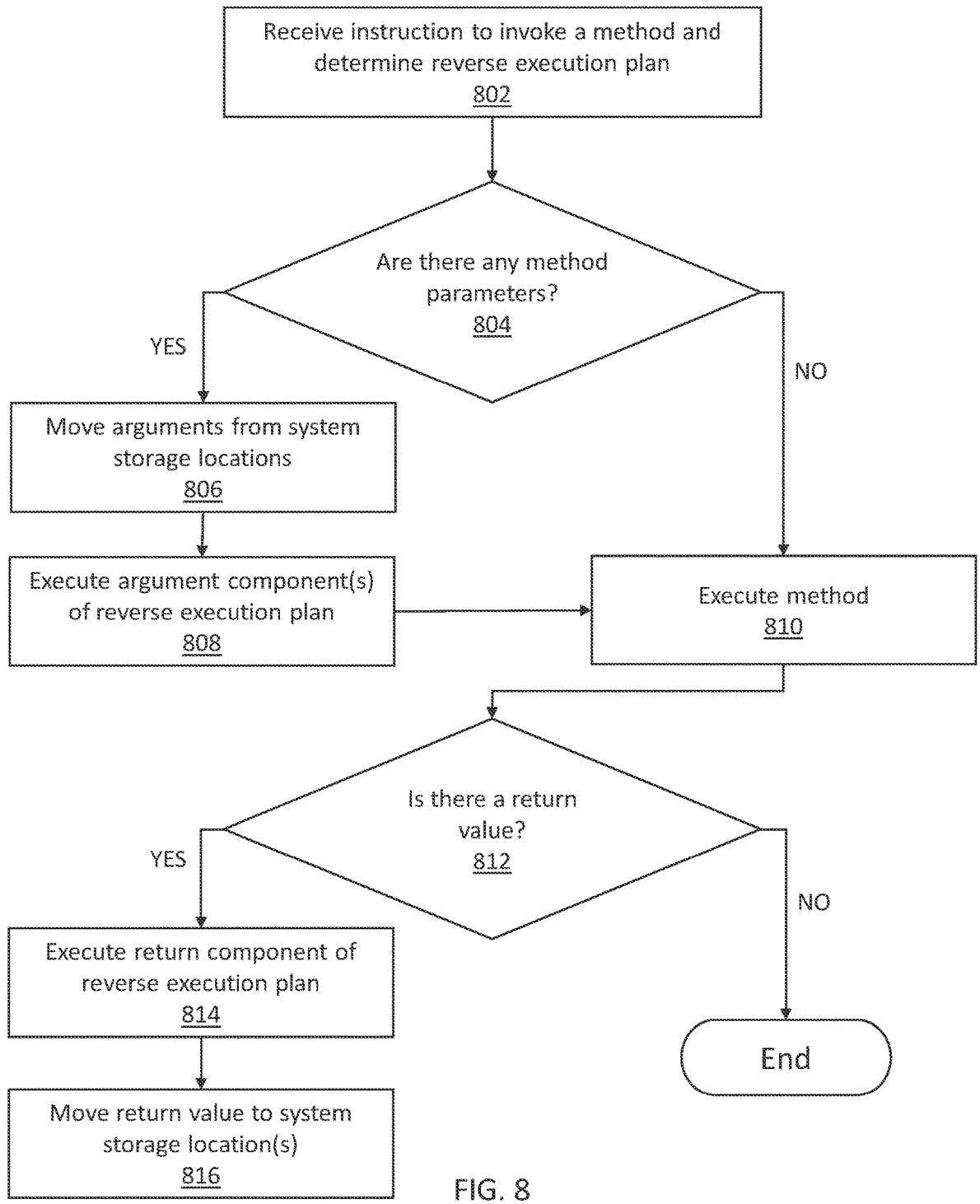
FIG. 8 illustrates a set of operations for passing a pointer to a method implemented in a second programming language to a function implemented in a first programming language in accordance with one or more embodiments

FIG. 8 illustrates a flowchart showing techniques for obtaining a memory address for corresponding to an entry point of a method (e.g., a MemoryAddress object) to be used as a reference to the method. The memory address may be obtained directly from the method or from an executable method reference (e.g., a Java MethodHandle object). One or more operations illustrated in FIG. 8 may be modified, rearranged, or omitted all together. Accordingly, the particular sequence of operations illustrated in FIG. 8 should not be construed as limiting the scope of one or more embodiments.

The system may receive an instruction to invoke a method implemented in a second programming language (Operation 802). The request can be received in the form of a method call made via a pointer (e.g., a memory address) to a specified method. The system may select a reverse execution plan based on the received instruction.

The system may determine if there are any arguments passed with the received instruction (Operation 804). If arguments were passed (YES at operation 804), the system may cause the arguments to be moved from system storage locations accessible to the native function (Operation 806). As an example, the system may invoke an assembly routine to move data positioned by the execution plan in operation 804 from system storage locations to the intermediate buffer. The assembly routine may be selected based on a specified system ABI. In some embodiments, the ABI is specified by a user (e.g., in one or more code instructions).

For each argument included with the instruction to execute the method, the system may execute a corresponding argument component of the determined reverse execution plan (Operation 808). As discussed above, the executed argument components of the reverse execution plan may preprocess the arguments based on the method type, the function descriptor and the selected ABI. For example, the method type may specify a Java MemoryAddress object be provided when a function is invoked, and the function descriptor may specify that an argument is received as a C pointer (and specify the size of such a pointer). The ABI can be used to determine the layout and alignment of the C pointer and the Java MemoryAddress object, so that the system can convert the data from the received C pointer to a properly formatted Java MemoryAddress object. Additionally, the executed argument components of the execution plan may further determine a particular storage location at which the Java MemoryAddress object is to be stored for use by the method.

The system may execute the method (Operation 810). In some embodiments, the method operates on one or more values (e.g., parameters) passed to the method, which are properly positioned based on the execution of the parameter components of the reverse execution plan. The method may produce data comprising a return value, and store the data in one or more system storage locations.

The system may determine if there is a return value from the method (Operation 812). If there is a return value (YES at Operation 812), the system may execute the return component of the selected reverse execution plan (Operation 814). The return component of the reverse execution plan may process the returned values provided by the method based on the method type, the function descriptor and the selected ABI. For example, the method type may specify that a MemoryAddress object is returned, while the function descriptor specifies that a C pointer is returned. The ABI can be used to determine the layout and alignment of the C pointer, so that the system can convert the data from the received MemoryAddress to a properly-formatted C pointer. In some embodiments, the reverse execution plan may place the processed return value in an intermediate buffer.

The system may move the return value form the intermediate buffer to one or more system storage locations (Operation 816). As one example, the execution plan may cause the system to invoke an assembly routine to move the data from the intermediate buffer to one or more system storage locations. The assembly routine may be selected based on a specified system ABI. In some embodiments, the ABI is specified by a user (e.g., in one or more code instructions).

7. Allocating Memory Via a Native Function

Native functions may need to allocate memory. For example, a native function may return data by passing the data by value. When passing data by value, a linked native function may create a copy of the data (e.g., a struct or other object in memory) to be returned and store the copy in a MemorySegment that is returned by the method handle generated by the foreign function.

The memory for the data object (e.g., the struct) must be allocated by the native function. One possible way to allocate memory is to invoke a standard memory allocation function (e.g., malloc in the C programming language). This produces accurate results, but may be suboptimal, as a new native heap allocation has to take place on each call of the memory allocation function. For example, consider the following lines code:

```
for (int i = 0 ; i < 1000 ; i++) {
    MemorySegment point = (MemorySegment)handle.invoke(i, i);
    printPoint(point);
    point.close( );
}
```

Executing this code segment causes the system to allocate memory on each method handle call (e.g., in each iteration of the loop), so that the returned struct is stored somewhere in the associated memory segment. However, following print operation, the system no longer has a particular use for the allocated struct.

Alternatively, instead of allocating memory for a struct each time a method handle is called, the system may add metadata to the method handle (e.g., an allocator argument) when invoking the method handle. In particular, metadata may cause the system to include a recycling allocator. As an example, consider an allocator implementation as follows:

```
interface Allocator {
    allocate(long size)
}
```

This allocator interface causes the system to allocate a memory segment having a defined size. Once a memory segment is allocated, the system can create a slice of the allocated memory segment to recycle the allocated memory segments. For example, consider the following code segment:

```
MemorySegment segment = MemorySegment.allocateNative(layout);
Allocator recyclingAllocator = size -> segment.asSlice(0, size)
for (int i = 0 ; i < 1000 ; i++) {
    printPoint(handle.invoke(recyclingAllocator, i, i));
}
```

The system creates a native memory segment having a defined layout. The system can create a slice of the existing memory segment as a recycling allocator rather than allocating a new segment for the object. The recycling allocator may be used to reduce the number of allocate operations required for execution of a native function, particularly when the resulting object passed by value is used immediately and then discarded.

This code segment, when executed, creates a recycling allocator which is a slice of the allocated memory segment having a predefined size. This same slice may store the results of all the function calls to the native method handle. In other words, each call of the native method handle overwrites the contents of the slice with a new Point struct. As discussed above, this behavior does not cause any issues during execution, since the struct is discarded immediately after use. However, the revised structure allows for the code to execute using only a single memory allocation before the loop, with no memory allocation taking place inside the loop. This significantly improves performance for the system. In some embodiments, a user may select an allocator for use with a function by, for example, including the allocator and/or an indication of the allocator as metadata when invoking the function.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
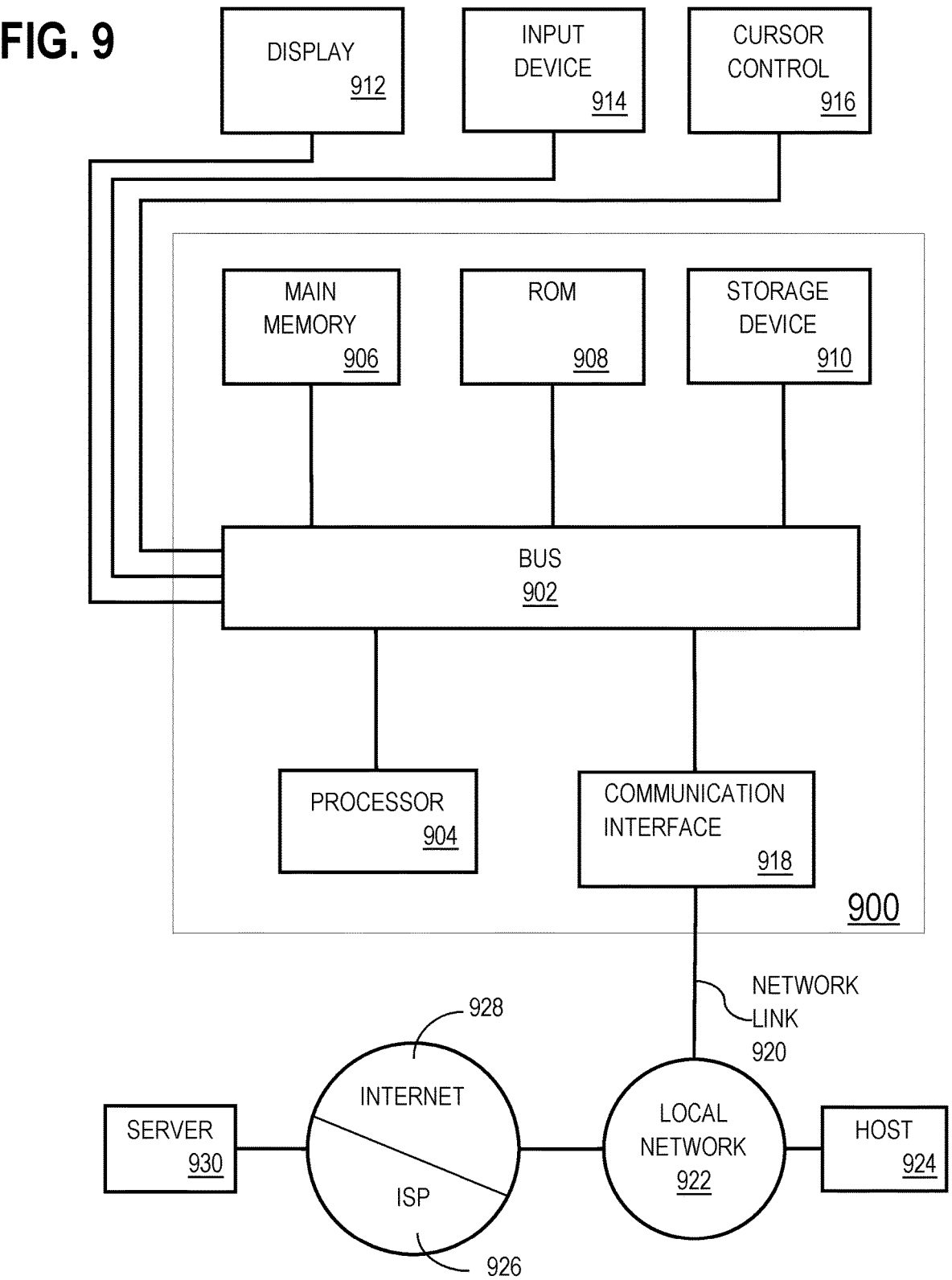
FIG. 9 illustrates a system in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 909 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 919 coupled to bus 902. Communication interface 919 provides a two-way data communication coupling to a network link 920 that is connected to a local network 922. For example, communication interface 919 may be an integrated services digital network (ISDN) card, cable modem, satellite modem, or a modem to provide a data communication connection to a corresponding type of telephone line. As another example, communication interface 919 may be a local area network (LAN) card to provide a data communication connection to a compatible LAN. Wireless links may also be implemented. In any such implementation, communication interface 919 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 929. Local network 922 and Internet 929 both use electrical, electromagnetic or optical signals that carry digital data streams. The signals through the various networks and the signals on network link 920 and through communication interface 919, which carry the digital data to and from computer system 900, are example forms of transmission media.

Computer system 900 can send messages and receive data, including program code, through the network(s), network link 920 and communication interface 919. In the Internet example, a server 930 might transmit a requested code for an application program through Internet 929, ISP 926, local network 922 and communication interface 919.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   receiving an instruction to create an executable reference for a function written using a first coding language, wherein the instruction includes:
      a method type comprising a method signature corresponding to the executable reference, and
      a function description including (a) a memory layout corresponding to data returned by the function and (b) one or more memory layouts corresponding to one or more parameters required by the function;
   selecting an application binary interface (ABI);
   generating code that, when executed:
      for each parameter of the function, converts the parameter from a value formatted for use by a second coding language to one or more values formatted for use in the function, based on the selected ABI;
      for any data returned by the function, converts the data from a value formatted for use in the function to a value formatted for use by the second coding language;
   receiving a command to invoke the executable reference, the command including metadata that affects execution of one or more of the generated code and the function;
   in response to receiving the command to invoke the executable reference, causing execution of the generated code and the function.

2. The one or more media of claim 1, wherein at least one of the one or more parameters is a memory address.

3. The one or more media of claim 1, wherein at least one of the one or more parameters is a memory segment.

4. The one or more media of claim 1, and wherein selecting the ABI comprises determining the first coding language, wherein the ABI is selected based on one or more of a first coding language or a hardware structure of the one or more processors.

5. The one or more media of claim 1, wherein the metadata comprises a memory address associated with an entry point into the function, and wherein including the memory address causes the system to execute the function beginning at the memory address.

6. The one or more media of claim 1, wherein the metadata comprises an allocator for use in allocating memory for the function.

7. One or more non-transitory machine-readable media storing instructions which, when executed by one or more processors, cause:
receiving an instruction to create a reference to a method written in a first coding language,
wherein the instruction includes:
an executable reference to the method, and
a function description including (a) a memory layout corresponding to data returned by a native function written in a second coding language and (b) one or more memory layouts corresponding to one or more parameters required by the native function;
selecting an application binary interface (ABI);
generating the native function written in the second coding language that:
converts, for each parameter of the one or more parameters, the parameter from a value formatted for use in the native function to a value formatted for use by the method, based on the selected ABI, and
causes execution of the method; and
returning a memory address associated with the generated native function.

8. The one or more media of claim 7, wherein at least one of the one or more parameters is a memory address.

9. The one or more media of claim 7, wherein at least one of the one or more parameters is a memory segment.

10. The one or more media of claim 7, wherein selecting the ABI comprises determining the first coding language, and wherein the ABI is selected based on one or more of a first coding language or a hardware structure of the one or more processors.

11. A method comprising:
receiving an instruction to create an executable reference for a function written using a first coding language,
wherein the instruction includes:
a method type comprising a method signature corresponding to the executable reference, and
a function description including (a) a memory layout corresponding to data returned by the function and (b) one or more memory layouts corresponding to one or more parameters required by the function;
selecting an application binary interface (ABI);
generating code that, when executed:
for each parameter of the function, converts the parameter from a value formatted for use by a second coding language to one or more values formatted for use in the function, based on the selected ABI;
for any data returned by the function, converts the data from a value formatted for use in the function to a value formatted for use by the second coding language;
receiving a command to invoke the executable reference, the command including metadata that affects execution of one or more of the generated code and the function;
in response to receiving the command to invoke the executable reference, causing execution of the generated code and the function;
wherein the method is performed by at least one device including a hardware processor.

12. The method of claim 11, wherein at least one of the one or more parameters is a memory address.

13. The method of claim 11, wherein at least one of the one or more parameters is a memory segment.

14. The method of claim 11, wherein selecting the ABI comprises determining the first coding language, and wherein the ABI is selected based on one or more of a first coding language or a hardware structure of the hardware processor.

15. The one or more media of claim 11, wherein the metadata comprises a memory address associated with an entry point into the function, and wherein including the memory address causes the system to execute the function beginning at the memory address.

16. The one or more media of claim 11, wherein the metadata comprises an allocator for use in allocating memory for the function.

17. A method comprising:
receiving an instruction to create a reference to a method written in a first coding language,
wherein the instruction includes:
an executable reference to the method, and
a function description including (a) a memory layout corresponding to data returned by a native function written in a second coding language and (b) one or more memory layouts corresponding to one or more parameters required by the native function;
selecting an application binary interface (ABI);
generating the native function written in the second coding language that:
converts, for each parameter of the one or more parameters, the parameter from a value formatted for use in the native function to a value formatted for use by the method, based on the selected ABI, and
causes execution of the method; and
returning a memory address associated with the generated native function,
wherein the method is performed by at least one device including a hardware processor.

18. The method of claim 17, wherein at least one of the one or more parameters is a memory address.

19. The method of claim 17, wherein at least one of the one or more parameters is a memory segment.

20. The method of claim 17, wherein selecting the ABI comprises determining the first coding language, and wherein the ABI is selected based on one or more of a first coding language or a hardware structure of the hardware processor.

21. A system comprising:
at least one device including a hardware processor;
the system being configured to perform operations comprising:
receiving an instruction to create an executable reference for a function written using a first coding language,
wherein the instruction includes:
a method type comprising a method signature corresponding to the executable reference, and
a function description including (a) a memory layout corresponding to data returned by the function and (b) one or more memory layouts corresponding to one or more parameters required by the function;
selecting an application binary interface (ABI);
generating code that, when executed:
for each parameter of the function, converts the parameter from a value formatted for use by a second coding language to one or more values formatted for use in the function, based on the selected ABI;

for any data returned by the function, converts the data from a value formatted for use in the function to a value formatted for use by the second coding language;

receiving a command to invoke the executable reference, the command including metadata that affects execution of one or more of the generated code and the function;

in response to receiving the command to invoke the executable reference, causing execution of the generated code and the function.

22. The system of claim 21, wherein at least one of the one or more parameters is a memory address.

23. The system of claim 21, wherein at least one of the one or more parameters is a memory segment.

24. The system of claim 21, wherein selecting the ABI comprises determining the first coding language, and wherein the ABI is selected based on one or more of a first coding language or a hardware structure of the hardware processor.

25. The system of claim 21, wherein the metadata comprises a memory address associated with an entry point into the function, and wherein including the memory address causes the system to execute the function beginning at the memory address.

26. The system of claim 21, wherein the metadata comprises an allocator for use in allocating memory for the function.

27. A system comprising:
at least one device including a hardware processor;
the system being configured to perform operations comprising:

receiving an instruction to create a reference to a method written in a first coding language,
wherein the instruction includes:
an executable reference to the method, and
a function description including (a) a memory layout corresponding to data returned by a native function written in a second coding language and (b) one or more memory layouts corresponding to one or more parameters required by the native function;

selecting an application binary interface (ABI);

generating the native function written in the second coding language that:
converts, for each parameter of the one or more parameters, the parameter from a value formatted for use in the native function to a value formatted for use by the method, based on the selected ABI, and
causes execution of the method; and
returning a memory address associated with the generated native function.

28. The system of claim 27, wherein at least one of the one or more parameters is a memory address.

29. The system of claim 27, wherein at least one of the one or more parameters is a memory segment.

30. The system of claim 27, wherein selecting the ABI comprises determining the first coding language, and wherein the ABI is selected based on one or more of a first coding language or a hardware structure of the hardware processor.

* * * * *

UNITED STATES PATENT AND TRADEMARK OFFICE
CERTIFICATE OF CORRECTION

PATENT NO. : 11,513,779 B2
APPLICATION NO. : 17/190214
DATED : November 29, 2022
INVENTOR(S) : Cimadamore et al.

It is certified that error appears in the above-identified patent and that said Letters Patent is hereby corrected as shown below:

In the Specification

In Column 7, Line 53, delete "add12andl3" and insert -- add12and13 --, therefor.

In the Claims

In Column 24, Line 10, in Claim 15, delete "one or more media" and insert -- method --, therefor.

In Column 24, Line 15, in Claim 16, delete "one or more media" and insert -- method --, therefor.

Signed and Sealed this
First Day of August, 2023

Katherine Kelly Vidal
*Director of the United States Patent and Trademark Office*